June 13, 1961   J. J. FRY   2,988,172
LUBRICATORS FOR VALVES
Filed Sept. 12, 1960   2 Sheets-Sheet 2

INVENTOR
Jeremy Joseph Fry
BY
Stevens Davis Miller & Mosher
ATTORNEY

United States Patent Office 2,988,172
Patented June 13, 1961

2,988,172
LUBRICATORS FOR VALVES
Jeremy Joseph Fry, Bath, England, assignor to Rotork Engineering Company Limited, Bath, England
Filed Sept. 12, 1960, Ser. No. 55,258
Claims priority, application Great Britain Sept. 24, 1959
7 Claims. (Cl. 184—28)

This invention relates to lubricators adapted to supply a lubricant between the mutually engageable and relatively movable parts of a valve. A lubricator of this type is described in copending application Serial No. 39,999, filed June 30, 1960, the lubricator being actuated by a device or devices responsive to resistance to the movement of the parts of the valve, so that lubricant is only supplied to the parts when necessary and immediately prior to the operation of the valve. The prior application is primarily concerned with valves having a relatively large bore and the lubricator is preferably, but not exclusively, operated by a torque-responsive device forming part of the valve actuator which may be power and/or hand operated.

The object of the present invention is to provide a novel lubricator which is particularly applicable for use with valves having a small bore.

The above object is carried out in accordance with the invention by providing the valve spindle with an actuating member which is operatively connected with the spindle through a torque responsive device. The torque responsive device may comprise a pump for supplying lubricant to the relatively movable parts of the valve, the pump being operated by relative movement between the actuating member and valve spindle.

In a preferred embodiment of the invention, the valve lubricator comprises a valve spindle, an actuating lever keyed to said spindle, a manually operable member freely rotatable on said lever, a cylinder mounted on said manually operable member, a piston in said cylinder and defining therewith a chamber for receiving lubricant, a rod on said piston engaging said actuating lever, and a passageway connecting said chamber in said cylinder with the mutually engageable and relatively movable parts of the valve.

Figure 1:
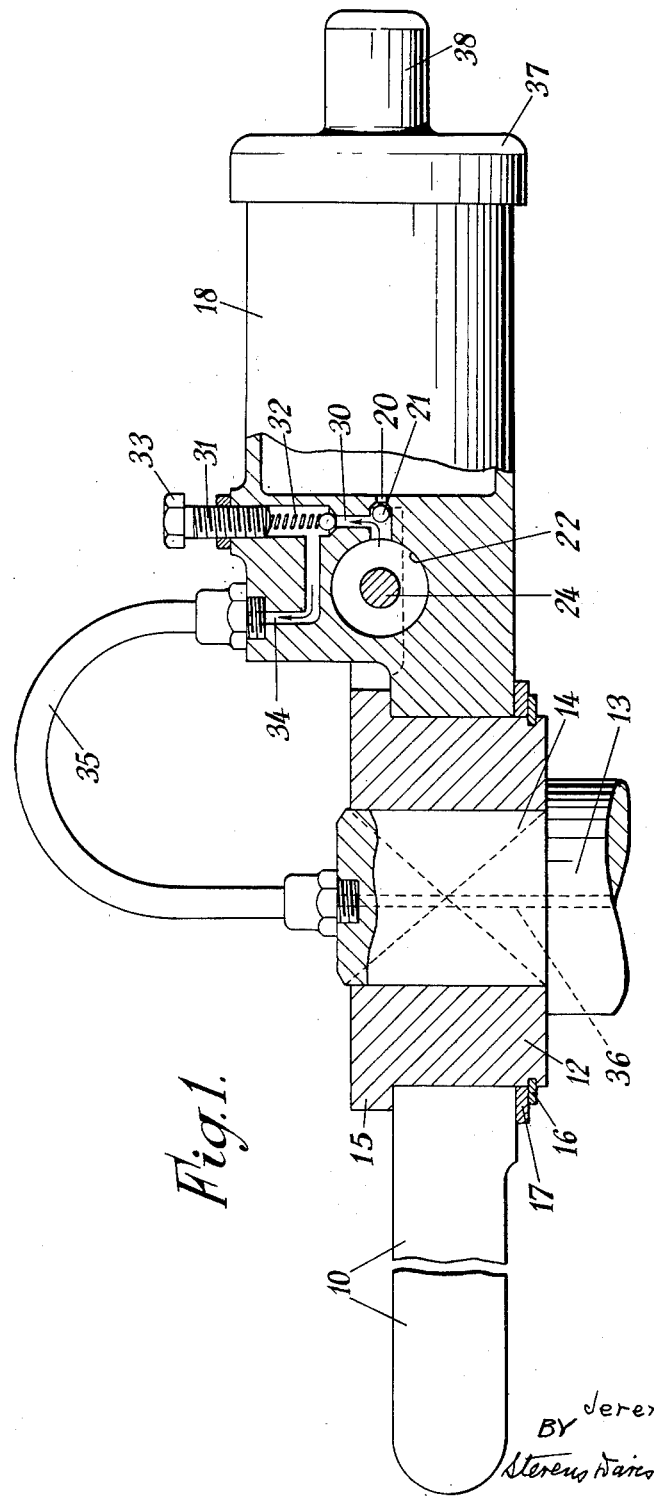
Figure 2:
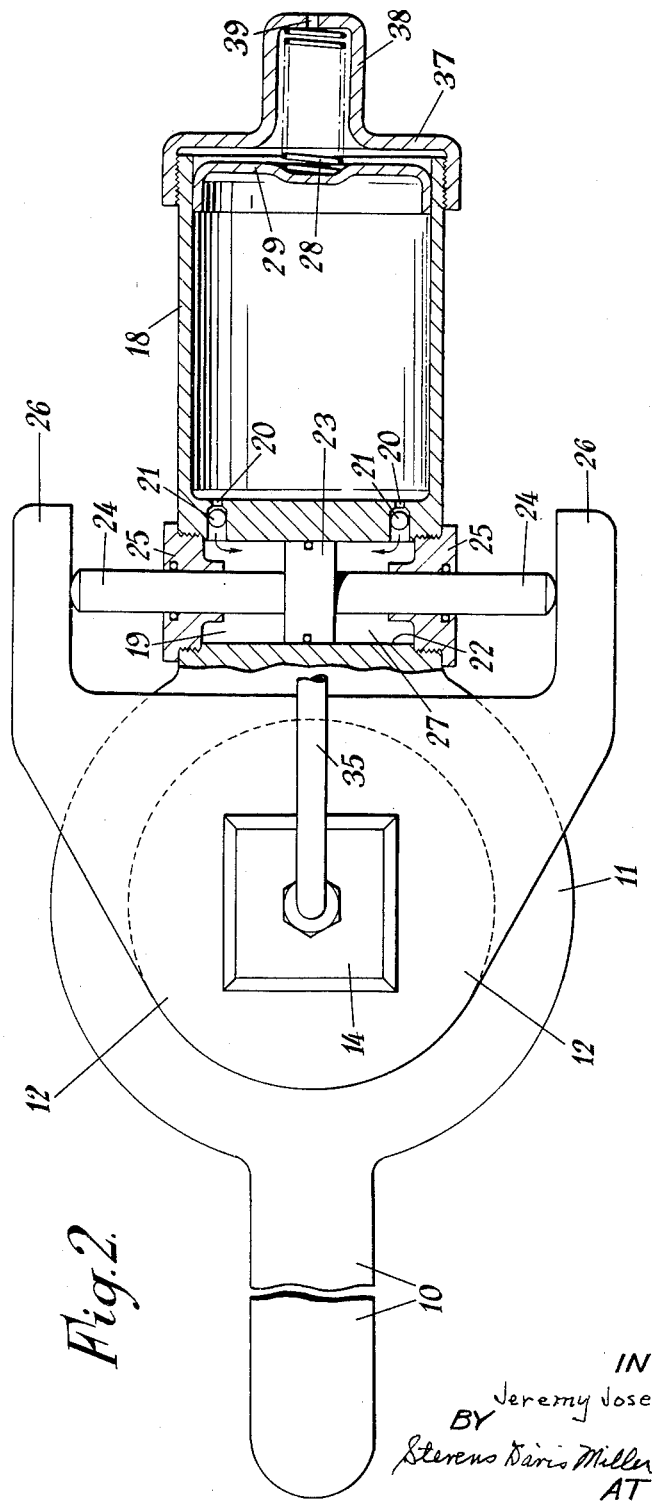

The preferred embodiment of the invention will now be described by way of example with reference to the accompanying drawings, in which:

FIGURE 1 is a part sectional elevation of a lubricating wrench for a small bore valve in accordance with the invention; and FIGURE 2 is a plan view partly in section of the lubricator of FIGURE 1.

Referring now to the drawings, the lubricator shown is intended for use with a small bore rotary cylindrical valve which is operated by a manual member shown as a wrench but which may be a hand-wheel or other suitable member.

The wrench handle 10 has an annular portion 11 which surrounds and is freely rotatable on an actuating lever 12 which is keyed to the valve spindle 13. In the drawings, the valve spindle 13 is formed with a squared end 14 to which the lever 12 is fitted. The handle 10 is held in position on the lever 12 by a flange 15 on lever 12 and a circlip 16 fitting a groove in lever 12. A packing washer 17 is also provided.

A lubricant reservoir 18 and a pump 19 are formed integral with the handle 10 so that rotation of the handle 10 about the valve spindle also moves the reservoir and pump casing. Lubricant from the reservoir 18 passes through ports 20 and past non-return valves 21 into pump 19. The pump 19 comprises a cylinder 22 formed in the extension of handle 10 and a double-acting piston 23. The piston 23 is provided with a pair of oppositely located piston or actuating rods 24 which slidably extend through closure members 25 threadably engaging the ends of the pump cylinder.

The outer ends of the rods 24 are rounded and engage the inner surfaces of a pair of lugs 26 which extend one on each side of the pump 19 and which are formed as extensions to the flange 15 on the actuating lever 12.

The piston 23 defines two chambers 27 in cylinder 22 each of which is connected with the reservoir 18 through a port 20. The lubricant in reservoir 18 is maintained under pressure by the spring 28 which acts against the movable plate 29. In the normal position of the parts so far described, the piston 23 is centrally located in cylinder 22 and each chamber 27 is filled with lubricant. Operation of the handle 10 in one or other direction rotatably moves the pump casing which by reason of the lubricant in the chambers 27 tends to move the piston 23 with it. A force is thereby exerted on one of the lugs 26 to rotate the lever 12 and thereby turn the valve spindle. Any resistance to movement of the valve parts will be reflected in the pump which acts as a torque-responsive device. As the torque increases the piston 23 will move in cylinder 22 and the movement will be a function of the stiffness of the valve. This movement of the piston is utilized to supply lubricant to the valve parts as now described.

Each chamber 27 is provided with an outlet port 30, one of which is shown in FIGURE 1. Each port 30 is controlled by a non-return adjustable pressure sensing valve 31 which includes a spring 32 the tension of which can be adjusted by a spring 33. The tension of spring 33 controls the pressure and thereby the torque, at which the lubricant will flow from the associated pump chamber. Lubricant passing from a chamber 27 passes a valve 31 and is then forced into a common conduit 34. The conduit 34 communicates with an external flexible pipe 35 which is connected to a passageway 36 in the valve spindle. The passageway 36 communicates with passages between the valve plug and its housing.

The reservoir 18 is filled with lubricant through an open end which is closed by a threaded closure cap 37. The closure cap 37 is provided with an extension 38 for spring 28. Extension 38 communicates to atmosphere through aperture 39 to permit free movement of pressure plate 29.

The lubricator according to the invention is primarily intended for use with plug cocks or valves of the rotary cylindrical or rotary conical type. In valves of this type lubricators have been provided in which fluid has been supplied to act as a lubricant and also as a seal between the moving parts. In some valve designs the fluid has also operated a jacking medium to lift a stuck valve. The invention is applicable to supply fluid so as to provide these three features, the lubricant being supplied as a function of the torque whenever the stiffness exceeds a predetermined amount. The lubricant is thereby supplied at any position of the valve.

The lubricator according to the invention is also adapted for use with any other type of valve that requires lubrication, such as parallel-sided, double-wedging, through-conduit valves, or various types of gate valve, or screw-down valves. The lubricator is adapted to be actuated by the torque-responsive device in either the closed or the open position of the valve.

I claim:
1. A valve lubricator comprising an actuating member adapted to be rigidly connected to the valve spindle, a manually operable member freely rotatable on said actuating member, and a torque responsive device interconnecting said members, said torque responsive device including a pump adapted to supply lubricant to the valve parts in response to relative movement of said members due to stiffness of the valve.

2. In a valve lubricator, a valve spindle, an actuating lever keyed to said spindle, a manually operable member freely rotatable on said lever, a cylinder mounted on said manually operable member, a piston in said cylinder and defining therewith a chamber for receiving lubricant, a rod on said piston engaging said actuating lever, and a passageway connecting said chamber in said cylinder with the mutually engageable and relatively movable parts of the valve.

3. A valve lubricator as claimed in claim 2, in which the piston is double acting, said piston being provided with a pair of rods extending in opposite directions therefrom and each engaging said actuating lever.

4. A valve lubricator as claimed in claim 3, wherein the piston defines two variable chambers in said cylinder, each of said chambers being supplied with lubricant from a reservoir through ports controlled by non-return valves.

5. A valve lubricator as claimed in claim 4, wherein each chamber communicates with said passageway through ports controlled by adjustable pressure sensing valves.

6. A valve lubricator as claimed in claim 5, in which the reservoir and lubricant pump cylinder are formed integral with the manually operable member.

7. A valve lubricator as claimed in claim 6, in which the actuating lever is formed with extensions located on opposite sides of the pump cylinder and each engaged by a rod connected with the pump piston.

References Cited in the file of this patent

UNITED STATES PATENTS

| | | |
|---|---|---|
| Re. 17,724 | Nordstrom | July 8, 1930 |
| 1,378,543 | Johnson | May 17, 1921 |